US006076962A

United States Patent [19]

Chen

[11] Patent Number: 6,076,962

[45] Date of Patent: Jun. 20, 2000

[54] INFRARED PROBE OF THERMOMETER

[76] Inventor: Chao-Wang Chen, 2F-4, No 8, Lane 44, Wan-An Street, Taipei, Taiwan

[21] Appl. No.: 09/251,179

[22] Filed: Feb. 17, 1999

[51] Int. Cl.[7] ................................ G01K 7/02; G01J 5/12; A61B 6/00

[52] U.S. Cl. .......................... 374/130; 374/133; 374/121; 374/158; 128/664; 128/736

[58] Field of Search .................................... 374/121, 133, 374/158, 208; 128/664, 736

[56] References Cited

U.S. PATENT DOCUMENTS

| | | | |
|---|---|---|---|
| 3,075,386 | 1/1963 | Daly | 374/133 |
| 3,282,107 | 11/1966 | Ekstrom, Jr. | 374/133 |
| 3,453,432 | 7/1969 | McHenry | 374/133 |
| 3,487,213 | 12/1969 | Horan et al. | 374/133 |
| 4,904,090 | 2/1990 | Oliver | 374/133 |
| 5,271,407 | 12/1993 | Pompei et al. | 374/158 |
| 5,653,238 | 8/1997 | Pompei | 600/474 |
| 5,653,239 | 8/1997 | Pompei et al. | 374/121 |
| 5,836,692 | 11/1998 | Pompei | 374/121 |

FOREIGN PATENT DOCUMENTS

| | | | |
|---|---|---|---|
| 0077729 | 6/1981 | Japan | 374/133 |
| 0748317 | 4/1956 | United Kingdom | 374/133 |

*Primary Examiner*—G. Bradley Bennett
*Assistant Examiner*—Gail Verbitsky
*Attorney, Agent, or Firm*—Raymond Y. Chan; David and Raymond

[57] ABSTRACT

This invention relates to an infrared probe of a thermometer. The infrared probe does not need a waveguide to contact with a sensor for transmitting heat. The infrared probe consists of a sensor unit disposed on a sensor base and surrounded by an isolation unit. Standing at this forefront, the sensor unit can detect the infrared rays directly to lead a precise measurement. Moreover, the cost will be reduced without disposing a waveguide tube on the sensor.

8 Claims, 2 Drawing Sheets

222

20

204

22

208

202

206

INFRARED PROBE OF THERMOMETER

BACKGROUND OF THE PRESENT INVENTION

This invention relates to an infrared thermometer, and more particularly to an infrared probe which is arranged to eliminate the conventional waveguide tube.

Traditional contact-type thermometers, such as mercury and electronic thermometers, are no longer preferred by the users because of their slow reaction and inconvenience. Under the requirements of easy-measure and easy-read, the infrared thermometers the new selection.

Mostly, an infrared thermometer comprises a probe for inserting into the ear of a human body to detect the body temperature. The conventional probe includes an infrared sensor and a waveguide tube adapted to transmit the thermo-wave (radiation) from the ear and eardrum to the infrared sensor.

FIG. 1 shows a cross sectional view of a conventional probe 10 having a hollow conical structure. The probe 10 is positioned to a front end of a thermometer 12. Inside the probe 10, there is an infrared sensor 104 disposed at a bottom end of the probe 10. Facing to a detecting side of the infrared sensor 104, a tubular waveguide 106 is extended from a tip end of the probe 10 to contact with the infrared sensor 104. A temperature sensor 108 is connected to infrared sensor 104 for detecting the temperature and connecting to a calculating unit for calculating the detected temperature.

Conventionally, if the temperature between the infrared sensor and the waveguide is different, the temperature calculation of thermometers contains error. To solve this problem, the waveguide can be made of high conductive metal which is mirrored and gold electroplated.

During the measurement, the probe 10 will insert into the ear and contact therewith. Because the temperature of the ear is higher than the probe 10, heat will transfer from the ear to the probe 10 and then to the waveguide 106 to increase the temperature. The infrared sensor 104 will be affected by this temperature change that results a measurement error.

In order to solve this problem, a tubular pipe 102 is disposed between the probe 10 and the waveguide 106, as shown in FIG. 2. The pipe 102 provides heat isolation between the probe 10 and the waveguide 106. This pipe 102 is made of conductive material which can isolate the sensor from heat. By insulating the heat transfer between the probe 10 and the waveguide 106 with the pipe 102, the temperature measurement error can thus be minimized.

However, once there has a waveguide to transmit the thermo-wave, energy loss can not be avoided and temperature measurement will never reflect the real.

SUMMARY OF THE PRESENT INVENTION

Accordingly, the object of this invention is to provide an infrared probe including a sensor unit adapted for directly detecting the temperature so as to reduce the measurement error in detecting thermo-wave, so that the measurement can be more precisely. Moreover, the cost will also be reduced by eliminating the waveguide tube used in the conventional sensor.

To achieve the above-mentioned object, an infrared probe including a sensor unit for detecting the temperature is disclosed, which is characterized by that the infrared sensor is positioned at a forefront position of the probe in order to directly detect the temperature, so that a conventional waveguide tube for contacting to the sensor for transmitting heat can be eliminated.

The sensor unit is disposed on a sensor base having heat insulation. The sensor unit includes an infrared sensor and a temperature sensor. An isolation unit surrounds the sensor unit to limit the measurement error caused by unneeded heat dispersion.

DETAILED DESCRIPTION OF THE PREFERRED EMBODIMENT

Figure 3:
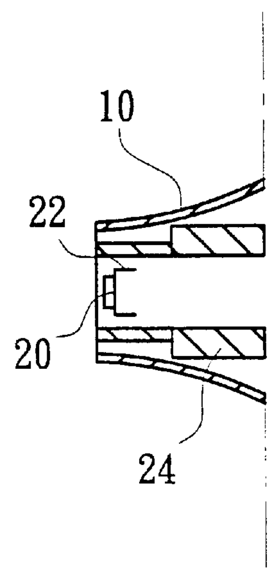
FIG. 3 is a cross-sectional view of an infrared probe according to a preferred embodiment of the invention.

Please refer to FIG. 3 which shows an infrared probe 10. The infrared probe 10 includes a sensor base 22 where a sensor unit 20 is disposed thereon. An isolation unit 24 surrounds the sensor unit 20 to isolate heat transferred from a shell of the infrared probe 10.

Figure 1:
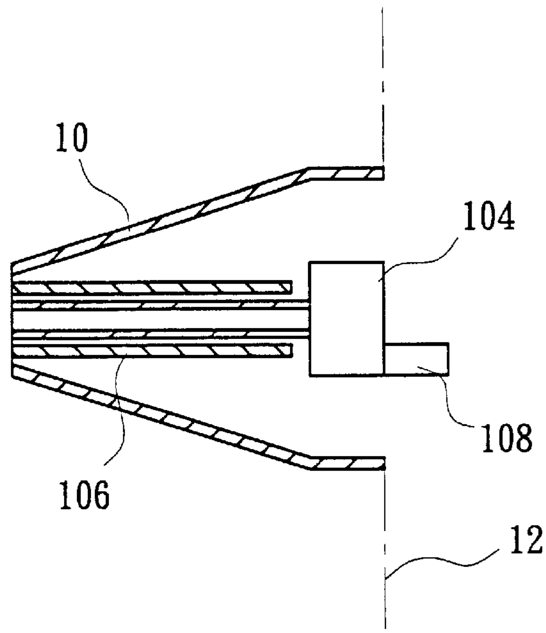
FIG. 1 is a cross-sectional view of a conventional infrared thermometer.
Figure 2:
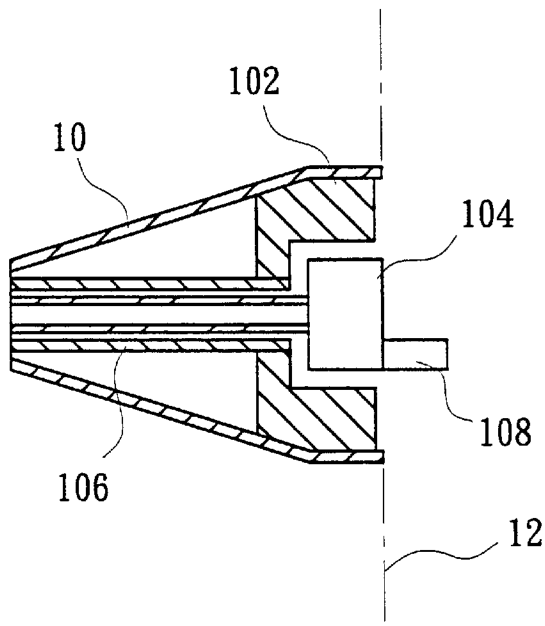
FIG. 2 is a cross-sectional view of another conventional infrared thermometer.

The inventor successfully develops the sensor unit 20 for the present invention, which is small enough to be disposed at a tip end of the infrared probe 10, so that the sensor unit 20 can directly detect the temperature of a measured object such as the temperature of a human ear. Therefore, a conventional waveguide is no longer needed for transmitting thermo-wave as foregoing description in FIG. 1 or FIG. 2. In the present embodiment, the measurement of temperature will mostly close to what the real temperature is by avoiding the energy losing during the conventional waveguide transmission.

The sensor base 22 is made of heat isolation material and affixed in the probe 10. The isolation unit 24 is applied to limit the heat transmitting caused by the temperature difference between the probe 10 and the sensor unit 20. The isolation unit 24 is made of conductive material that can transit the heat quickly so that the heat from the probe will not affect the measurement of the sensor unit 20 so as to reduce the temperature measurement error.

Figure 4:
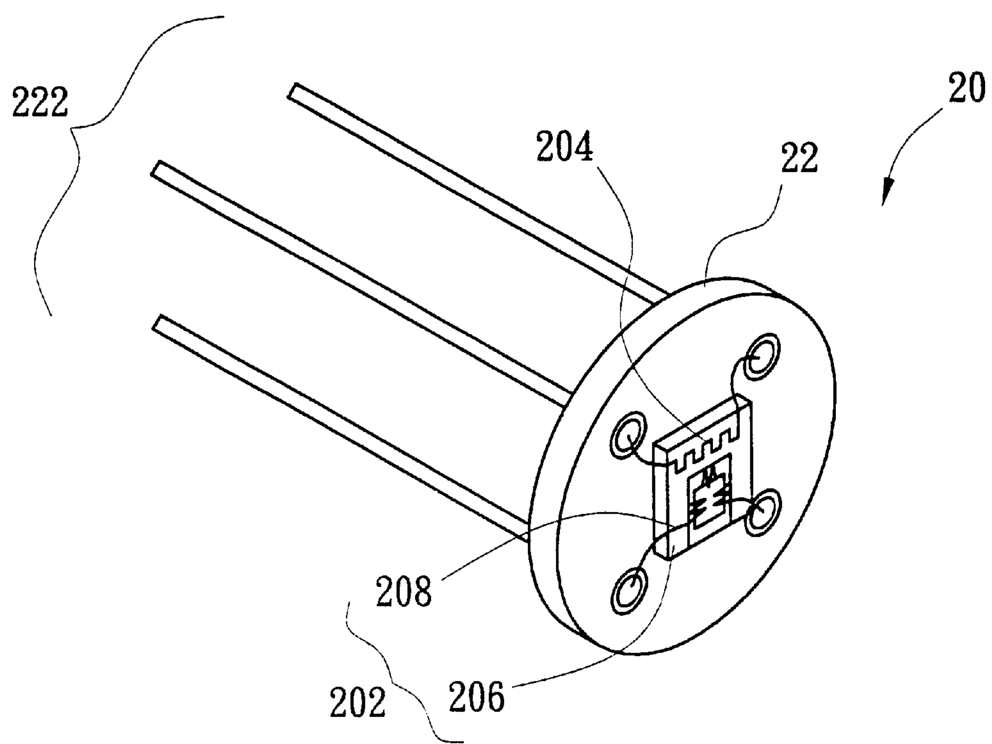
FIG. 4 is a perspective view of the sensor unit as shown in FIG. 3 according to the above preferred embodiment of the invention.

FIG. 4 shows the structure of the sensor unit 20. The sensor unit 20 on the sensor base 22 includes an infrared sensor 202 and a temperature sensor 204. There are output pins 222 connected to the sensor base 22. The infrared sensor 202 and the temperature sensor 204 are made on a silicon base 206 by sedimentation, which also serves as a cold junction of the infrared sensor 202. A hot junction 208 is made by an etched thin film to isolated it from the cold junction 206. When infrared rays shined into the probe 10, it will be absorbed by the hot junction 208. After absorbed the infrared rays, the hot junction 208 will be warmed up so that its temperature will become higher than the cold junction 206, i.e. the silicon base. This effect causes a temperature difference. If we connect the hot junction 208 and the cold junction 206 by thermocouples, the temperature difference will reduce an electrical voltage which is called as Seebeck-Effect. According to this electrical voltage, which should be proportional to the temperature difference counted out between the cold junction 206 and the hot junction 208.

The temperature sensor 204 is integrally made beside the infrared sensor 202 so as to detect the temperature of the surrounding by the temperature sensor 204 that is applied as a counting reference base for the cold junction 206. By this design, the reference base can avoid some disadvantage of prior art such as measurement error and heat dispersion.

While a particular embodiment of this invention has been shown and described, it is not intended to limit the same to details of the construction set forth, but instead, the invention embraces such changes, modifications and equivalents of the various parts of their relationships as come within the preview of the appended claims.

What is claimed is:

1. An infrared probe, comprising:

a sensor base having a plurality of output pins connected thereto;

a sensor unit disposed on said sensor base, said sensor unit having a size adapted to be fittingly disposed at a tip end of said infrared probe, so as to enable said sensor unit directly detecting a temperature surrounding said tip end of said infrared probe, wherein said sensor unit further includes an infrared sensor and a temperature sensor, said infrared sensor and said temperature sensor being made on a silicon base which serves as a cold junction of said infrared sensor, a hot junction being made by an etched thin film to be isolated from said cold junction, wherein when infrared rays are shining into said infrared probe, said infrared rays are absorbed by said hot junction, and that after absorbing said infrared rays, said hot junction is warmed up so that a temperature thereof becomes higher than said cold junction that results in a temperature difference, wherein said temperature sensor is integrally made adjacent said infrared sensor so as to detect a surrounding temperature of said infrared sensor by said temperature sensor, wherein said surrounding temperature is applied as a counting reference base for said cold junction; and an isolation unit surrounding said sensor unit and isolating heat transferred from said infrared probe, so as to limit a heat transmitting caused by a temperature difference between said infrared probe and said sensor unit.

2. An infrared probe as recited in claim 1 wherein said hot junction is connected with said cold junction by thermocouples, wherein a temperature difference counted out between said cold junction and said hot junction reduces an electrical voltage, which is known as Seebeck-Effect proportional to said temperature difference.

3. An infrared probe as recited in claim 1 wherein said sensor base is made of heat isolation material and affixed in said probe.

4. An infrared probe as recited in claim 2 wherein said sensor base is made of heat isolation material and affixed in said probe.

5. An infrared probe as recited in claim 1 wherein said isolation unit is made of conductive material for transferring heat from said shell of said infrared probe quickly.

6. An infrared probe as recited in claim 2 wherein said isolation unit is made of conductive material for transferring heat from said shell of said infrared probe quickly.

7. An infrared probe as recited in claim 3 wherein said isolation unit is made of conductive material for transferring heat from said shell of said infrared probe quickly.

8. An infrared probe as recited in claim 4 wherein said isolation unit is made of conductive material for transferring heat from said shell of said infrared probe quickly.

* * * * *